US012602989B2

(12) United States Patent
Rekstad et al.

(10) Patent No.: US 12,602,989 B2
(45) Date of Patent: Apr. 14, 2026

(54) REMOTE PAIRING USING AUDIO FINGERPRINTS

(71) Applicant: Comcast Cable Communications, LLC, Philadelphia, PA (US)

(72) Inventors: Michael Rekstad, Philadelphia, PA (US); Clyde Robbins, Bensalem, PA (US); Michael Sallas, Radnor, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/675,161

(22) Filed: Feb. 18, 2022

(65) Prior Publication Data

US 2023/0267824 A1 Aug. 24, 2023

(51) Int. Cl.
*G08C 17/02* (2006.01)
*G10L 25/51* (2013.01)

(52) U.S. Cl.
CPC .............. *G08C 17/02* (2013.01); *G10L 25/51* (2013.01); *G08C 2201/20* (2013.01)

(58) Field of Classification Search
CPC ...... G08C 17/02; G08C 2201/20; G10L 25/51
See application file for complete search history.

(56) References Cited

U.S. PATENT DOCUMENTS 9,131,108 B2 9/2015 Naidu et al.
9,490,998 B1 * 11/2016 Danciu ................. H04L 67/142
10,958,645 B2 3/2021 Brands et al.
2012/0245722 A1 * 9/2012 Yamamura ....... H04N 21/43615 700/94
2013/0089026 A1 * 4/2013 Piper ........................ H04R 5/04 370/328
2015/0162006 A1 6/2015 Kummer
2015/0243163 A1 * 8/2015 Shoemake ....... H04N 21/42203 367/197
2016/0125733 A1 * 5/2016 Sallas .................... G08C 17/02 398/106
2017/0243474 A1 * 8/2017 Greene .................. G08C 17/02
2022/0385991 A1 * 12/2022 Silverstein ......... H04N 21/8113

* cited by examiner

*Primary Examiner* — Omer S Khan
(74) *Attorney, Agent, or Firm* — Banner & Witcoff, Ltd.

(57) ABSTRACT

Systems, apparatuses, and methods are described for pairing a remote control with a controllable device using audio to confirm device pairings. The controllable device and remote control may communicate using low power protocols such as, for example, RF4CE, WiFi and/or Bluetooth low energy (BLE). The controllable device and the remote control may record and/or fingerprint audio. Corresponding audio and/or fingerprints may indicate proximity and cause the devices to initiate a pairing sequence. The audio may be any kind of audio, including for example, ambient noise, TV audio, and the like.

31 Claims, 6 Drawing Sheets

REMOTE PAIRING USING AUDIO FINGERPRINTS

BACKGROUND

Wireless remote controls offer convenience in using computing devices, such as digital video recorders (DVR), televisions, audio assistant and music devices, etc. Pairing a wireless remote control with a controllable computing device can sometimes present challenges, such as when multiple controllable computing devices receive a wireless pairing request from a remote control that is seeking to pair with one of them. These and other shortcomings are identified and addressed by the disclosure.

SUMMARY

The following summary presents a simplified summary of certain features. The summary is not an extensive overview and is not intended to identify key or critical elements.

Ambient sounds may be different at different locations in an environment, and systems, apparatuses, and methods are described for using ambient sounds near a remote control and a controllable device to determine whether the controllable device is close enough to the remote control such that pairing is appropriate. For example, a remote control may send a radio frequency (RF) pairing announcement, and a controllable device may receive the RF pairing announcement and respond with audio recording parameters such as, for example, a start time and a duration, so that both the controllable device and the remote control may record sounds at similar times. The recordings, or fingerprints of the recordings, may be compared, and if the recordings are a close enough match, pairing may be appropriate. Multiple controllable devices may receive the pairing announcement, and may coordinate with the remote control and/or with each other for recording samples of ambient sounds. If there are multiple close matches, an interface may be displayed to allow for selection from the controllable devices that provided the close matches, and/or additional steps may be taken to resolve the ambiguity. The success of matching may be tracked over time, and matching thresholds and/or the recording parameters may be adjusted to assist in the pairing process.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
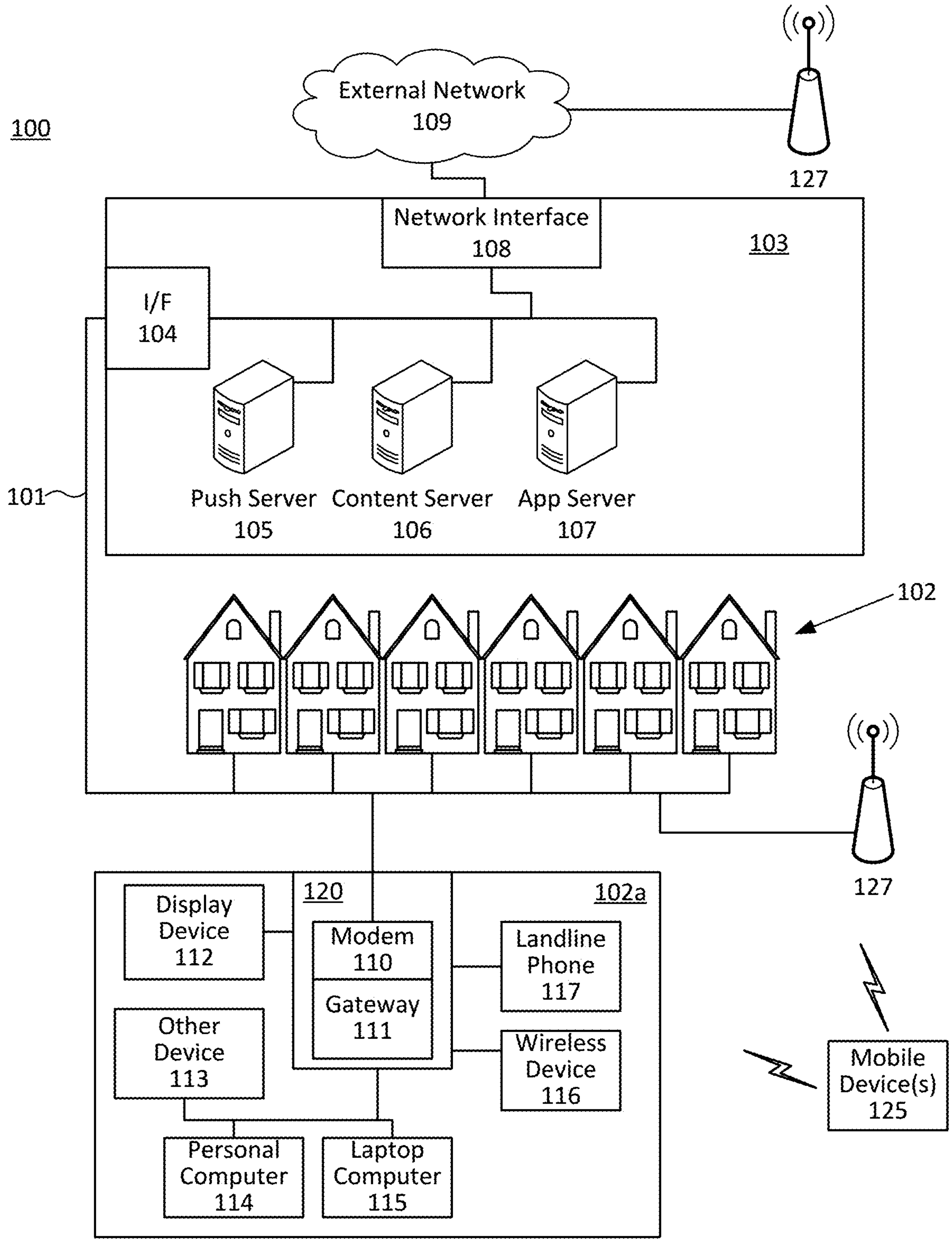
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined and/or server operations described herein may be distributed among servers or other devices in ways other than as indicated by examples included herein. Also or alternatively, one or more servers (not shown) may be part of the external network 109 and may be configured to communicate (e.g., via the local office 103) with other computing devices (e.g., computing devices located in or otherwise associated with one or more premises 102). Any of the servers 105-107, and/or 122, and/or other computing devices may also or alternatively be implemented as one or more of the servers that are part of and/or accessible via the external network 109. The servers 105, 106, and 107, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
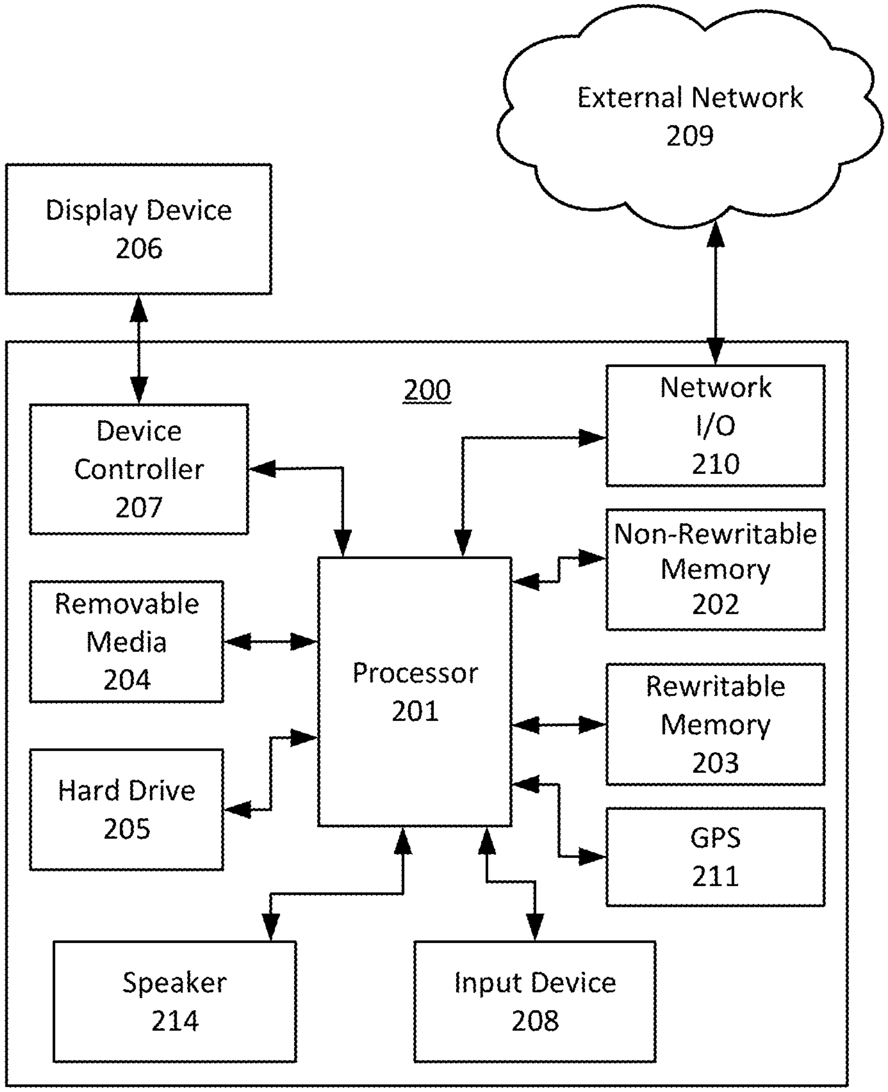
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., a remote control). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
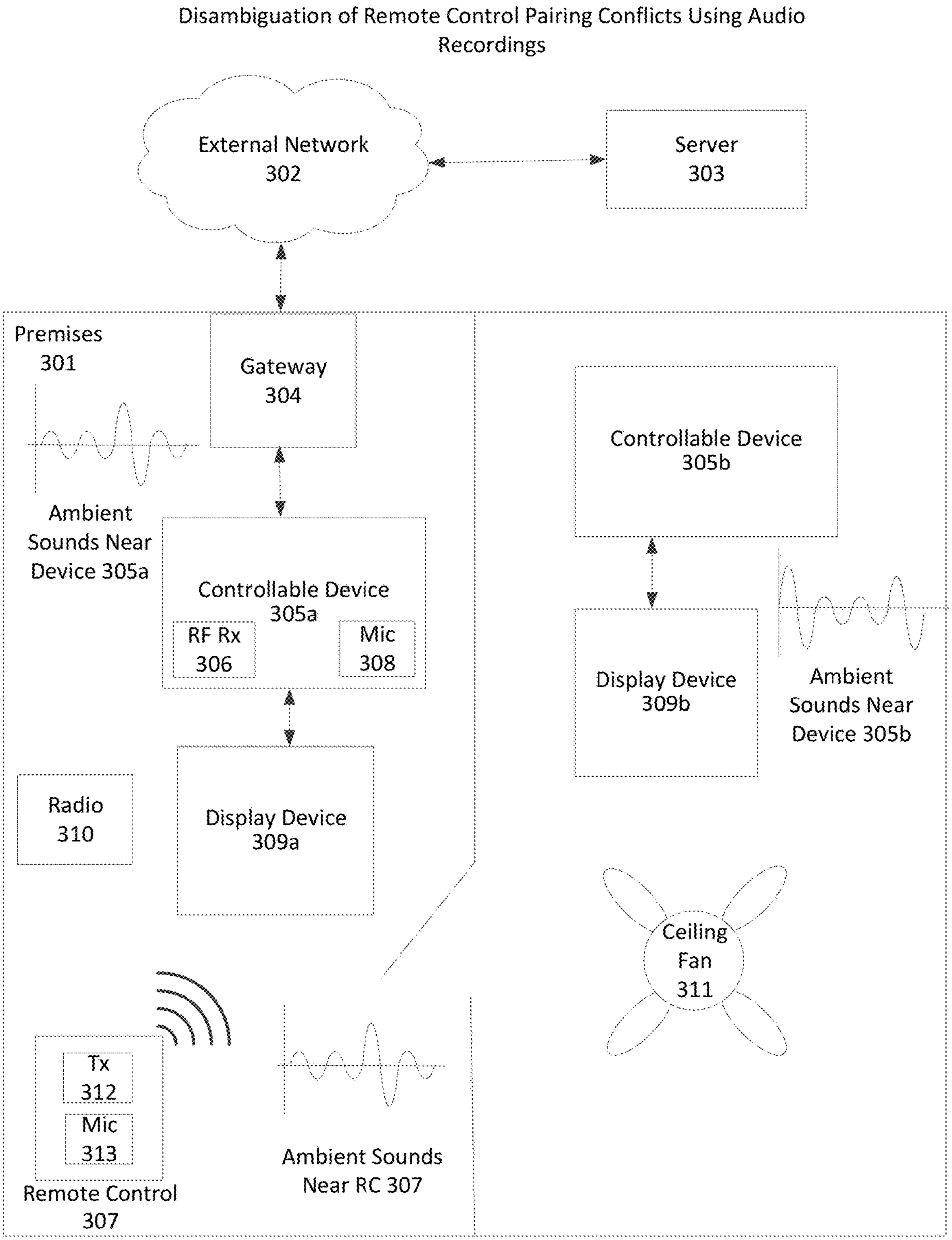
FIG. 3 shows an example of a system for pairing a remote control with a controllable device.

FIG. 3 shows an example of a system for pairing a remote control with a computing device using audio fingerprints. Although the examples of FIG. 3 (and of subsequent FIGS. 4-6G) describe the pairing of a remote control with a controllable computing device, such as a DVR, the methods described herein may also, or alternatively, be used to pair the remote control with other types of controllable computing devices, such as televisions, monitors, audio receivers, satellite receiver, cable boxes, DVRs, HDD recorders, CD players, DVD players, Blu-Ray players, amplifiers, stereo equipment, audio assistants, music devices, home automation equipment, or other computing devices such as those described above in FIG. 1 or 2. As will be explained in more detail below, a remote control 307 may transmit a wireless pairing signal that may be received by both or either one of controllable device 305*a* and controllable device 305*b*. To determine which controllable device 305*a/b* should be paired, the system herein may cause all, or some, of the three devices to record a sample of their local ambient sounds, or other audio, and their recordings may be compared to determine which controllable device 305*a/b* is closer to the remote control 307. The controllable device with the better matching sample may be selected for pairing with the remote control 307.

One or more elements of FIG. 3 may be elements from FIG. 1. Network 302 may, for example, comprise the communication links 101 and/or the external network 109 and/or other networks. Premises 301 may be a premises such as the premises 102*a*. Server 303 may, for example, comprise one or more application servers 107 located in one or more local offices 103 or elsewhere. Server 303 may be in communication with devices located at the premises 301 via the network 302 and may be configured to receive audio recordings from the devices. Server 303 may also be configured to execute software that may generate fingerprints of the audio recordings and that may determine whether the fingerprints match or otherwise correspond to one another. Server 303 may be configured to send the fingerprints and also, or alternatively, the determination of whether the fingerprints match or otherwise correspond to one another to the devices located at the premises 301.

Server 303 is shown as separate from the premises 301 in the example of FIG. 3. Various elements depicted in FIG. 3 may be implemented or grouped together in any way desired. The functionality of the server 303 may be implemented at one or more devices located at the premises 301, such as is described below.

Premises 301 includes a gateway 304. The gateway 304 may be, for example, a computing device such as the interface 120 of FIG. 1. The gateway 304 may communicate with the server 303 via the network 302. The premises 301 may also include controllable devices 305*a-b*, which may be a digital video recorder (DVR), having a network interface suitable for exchanging communications via a local network, the network 302, and/or other networks. The controllable devices 305*a-b* may be any type of computing device, such as computing device 200, television, monitor, audio receiver, satellite receiver, cable box, DVR, HDD recorder, CD player, DVD player, Blu-Ray player, amplifier, stereo equipment, audio assistants, music devices, home automation equipment, or other computing device such as described above in FIG. 1 or 2, that is capable of pairing with one or more remote controls. The gateway 304 may communicate with the controllable devices 305*a-b* via, e.g., a local network within the premises 301, which may be a wired network or a wireless network. Although two controllable devices 305*a-b* are shown in FIG. 3, the premises 301 may include any number of controllable devices, including a single controllable device. The controllable devices 305*a-b* may be configured to communicate with each other via the local network within the premises 301. The controllable devices 305*a-b* may be configured to discover other computing devices in the local network by sending a device discovery request via the local network. A device discovery request may be sent periodically or after detection of a new device on the network. Additionally, or alternatively, the controllable devices 305*a-b* may obtain a list of devices connected to the local network from, for example, the gateway 304 or a server not on the local network, such as the server 303. The controllable devices 305*a-b* may be configured to listen for announcements, such as pairing announcements, or discovery requests from a remote control, such as remote control 307, or other audio that may trigger the pairing process, such as voice commands or sounds generated by the controllable devices 305*a-b* or the remote control 307. The controllable devices 305*a-b* may be able to query other controllable devices as to whether the controllable device is paired with a remote control (or unpaired) or whether the controllable device has received a pairing announcement, such as is described below.

The controllable devices 305*a-b* may be configured to communicate with the remote control 307, via a wireless communications link. The controllable devices 305*a-b* may comprise a wireless receiver, such as an RF receiver 306, and which may be configured to listen or scan for signals, such as signals from the remote control 307. One such signal might be the remote control announcing that it is seeking to pair with a controllable device with a device discovery request. The controllable devices 305*a-b* may comprise a signal analyzer that may be figured to determine signal strength, location of remote devices using RF triangulation techniques, time of arrival, amplitude of arrival, etc. After receiving such a signal, the controllable devices 305*a-b* may be configured to generate and send a message to the remote control 307. The message may include recording parameters to assist with recording and fingerprinting audio to confirm and initiate pairing with the remote control that sent the signal, such as is described below. Additionally, or alternatively, the signal containing the announcement may also contain such recording parameters so that any receiving controllable device may receive the same recording parameters.

The controllable devices 305*a-b* may comprise one or more of: a microphone 308, a microphone array (not shown), or a speaker (not shown). The controllable devices 305*a-b* may be configured to record audio received via the microphone 308, such as ambient sounds near device 305*a* (or 305*b*) as shown in FIG. 3, or via other computing devices, such as display devices 309*a-b*. The controllable devices 305*a-b* may also be configured to execute software that may generate a fingerprint of the recorded audio and also, or alternatively, be configured to send the recorded audio to the server 303 for fingerprinting. A fingerprint may indicate parameters of the recorded audio, such as indications of signal strength (e.g., sound volume) for different frequencies. A fingerprint may also represent a digital summary of the main attributes of the audio, including, for example, time, intensity, frequency, pattern, or changes of the attributes over time. The controllable devices 305*a-b* may be configured to generate and play a sound via the speaker which may trigger the pairing process with the remote control 307. Also, or alternatively, the controllable devices 305*a-b* may be configured to detect a sound or sound sequence that may trigger the pairing process, including, e.g., the sending of the recording parameters, or initiating a pairing sequence.

The controllable devices 305*a-b* may be configured to receive audio recordings and also, or alternatively, fingerprints of audio recordings from other devices, such as the remote control 307. The controllable devices 305*a-b* may further be configured to execute software that may determine whether any of the fingerprints (generated or received) match, or otherwise correspond, to one another. Matching fingerprints of recorded audio may indicate that the two devices recorded the same, or substantially similar audio, and are, therefore, in the same room and/or are near one another. Controllable devices 305*a-b* may both record audio according to the audio recording parameters (e.g., an instruction to record audio, a start time, an end time, a duration, an instruction to fingerprint the recorded audio or the like) but may not have matching fingerprints because the audio recorded by the controllable devices 305*a-b* and the remote control 307 may be affected by their surroundings. For example, the ambient sounds near the controllable device 305*a* and the remote control 307 may be affected similarly by proximate noise sources, such as a radio 310, an open window, a dog barking, or the like. The ambient sounds near the controllable device 305*b* may be affected by proximate noise sources, such as a ceiling fan 311. Matching fingerprints may be identical, or substantially identical, to constitute a match. A threshold for determining a match may be established. The threshold may be dynamic and may change over time. The success and/or failure rates of matching may be tracked over time and may inform the setting or adjusting of the threshold. The threshold may be for a single system (e.g., at a single premises) or for more than one system. The controllable devices 305*a-b* may be configured to store the threshold and/or information relating to the threshold. The controllable devices 305*a-b* may also, or alternatively, be configured to send the threshold and/or information relating to the threshold to the remote control 307, the gateway 304, the server 303, or other computing device for storage. The recording parameters may also be set or adjusted based on the success and/or failure rate information.

Because the remote control 307 is in the same room as the controllable device 305*a*, it is likely that a user is trying to pair the device with controllable device 305*a*, rather than controllable device 305*b*. The controllable device 305*a* may determine a fingerprint from its own recorded audio matches a fingerprint of audio received from the remote control 307. The controllable device 305*a* may send an indication of the match to the remote control 307 or otherwise initiate a pairing sequence with the remote control 307. Conversely, the controllable device 305*b* may determine that a fingerprint from its own recorded audio may not match a fingerprint of audio received from the remote control 307, and then the controllable device 305*b* may not initiate a pairing sequence with the remote control 307. Additionally, or alternatively, the controllable devices 305*a-b* may be configured to communicate with each other over the local network at the premises 301. The controllable devices 305*a-b* may be configured to coordinate over IP via WiFi or Ethernet using backend registration or using generic device discovery (e.g., Bonjour, Universal Plug and Play (UPnP), or HDMI Consumer Electronics Control (CEC)). The controllable device 305*a*, for example, may be able to query the controllable device 305*b*, or other devices at the premises, such as display devices 309*a-b*, to determine whether the controllable device 305*b* has received the pairing announcement and/or to coordinate a response to the remote control 307. Controllable device 305*a-b* may be able to coordinate responding to the remote control 307 with its corresponding display device 309*a-b*, e.g., controllable device 305*a* and corresponding display device 309*a* may respond to the remote control 307 and/or may pair with the remote control 307 as a single device. The controllable devices 305*a-b* may be configured exchange their respective recorded audio and/or audio fingerprints in furtherance of determining potential matches for pairing with the remote control 307, such as is described below. The controllable devices 305*a-b* may also be configured to filter multiple matching controllable devices, including whether another controllable device is already paired with a remote control and whether the controllable device is expecting to pair with a remote control. The controllable devices 305*a-b* may also be configured to cause display of a user interface for user selection of an intended controllable device and to cause pairing with the remote control 307.

The remote control 307 may be any standard remote control or any computing device capable of acting as a remote control, such as a phone with an application that would allow it to pair with one or more controllable devices. The remote control 307 may be configured to send a signal to controllable devices via a transmitter 312, such as an RF transmitter. The signal sent by the remote control 307 may include various types of information, such as information identifying the remote control, such as device type, power source, supported security, serial number, pairing information such as vendor IDs, supported device types, profile IDs, requested device type, recording parameters, class descriptors, filters, operational commands and the like. The remote control 307 may send data in an RF transmission over channels, such as channels accessed using IEEE 802.11, 802.15, or Bluetooth Low Energy (BLE) protocols, announcing that the remote control is available for pairing and/or that the remote control 307 is seeking discovery of potential controllable devices, such as an RF4CE discovery request message or a BLE advertisement. The announcement may be sent once, may be repeated periodically for a predetermined time period, or repeated until a response is received. The announcement may be received by any controllable device within range of the remote control 307, including the controllable devices 305*a-b*, and listening on those channels. The signals from the remote control 307 can be sent using any low power wireless communication protocols including, for example, IEEE 802.11, 802.15, LTE, ZigBee RF4CE, 6LoWPAN, LoRa, Bluetooth, BLE, ISA100.1a, Wireless HART, MiWi, Thread, SNAP, etc. The remote control 307 may be triggered to announce that it is available for pairing by a user pressing a button or key combination on the remote, by a user putting batteries in the remote control, by a user charging the remote control, by performing speech recognition of a voice command, by determining that it is proximate to a controllable device, or the like. The remote control 307 may comprise a signal analyzer that may be figured to determine signal strength, location of controllable devices using RF triangulation techniques, time of arrival, amplitude of arrival, etc. The remote may be configured to indicate as part of the announcement that it would like to be paired with a certain type of controllable device, for example a set top box or a television. Additionally, or alternatively, the remote control may be configured to display a user interface and receive input regarding the type of device the user would like to pair with the remote control.

The remote control 307 may be configured to receive signals from the controllable devices 305*a-b* to pair with one or more controllable devices, such as is described below. The received signal may, for example, include parameters for recording and/or fingerprinting audio. The remote control 307 may comprise a microphone 313, a microphone array (not shown), or a speaker (not shown). The remote control 307 may be configured to record audio received via the microphone 313, such as the ambient noise or other sounds near the remote control 307 as shown in FIG. 3, in accordance with the parameters provided by the controllable device(s) 305*a-b*. The remote control 307 may also be configured to execute software that may generate a fingerprint of the recorded audio and also, or alternatively, be configured to stream the audio to the controllable devices 305*a-b* and also, or alternately, to the server 303 for fingerprinting. The remote control 307 may send the fingerprint and/or the recorded audio to one or more controllable devices. Additionally, or alternatively, the remote control 307 may be configured to send signal including parameters for recording audio and to receive and compare audio fingerprints to determining matches. The remote control 307 may be configured to generate and play a sound via the speaker which may trigger the pairing process with the controllable devices 305*a-b*. Also, or alternatively, the remote control 307 may be configured to detect a sound or sound sequence that may trigger the pairing process, including, e.g., the sending of the recording parameters, or initiating a pairing sequence.

Multiple display devices, including display devices 309*a-b* may be operatively connected to the controllable devices 305*a-b*. Display devices 309*a-b* may be connected to the controllable devices 305*a-b* via a wired or a wireless connection. Alternatively, display devices 309*a-b* may be connected to the gateway 304 without also being connected to the controllable devices 305*a-b*. Display devices 309*a-b* may comprise any type of display device, including, for example, a television having an application that can communicate with the gateway to receive television services. Display devices 309*a-b* may separate from, or implemented as part of, the controllable devices 305*a-b*.

The display devices 309*a-b* may also comprise controllable devices and may be able to be controlled by the remote control 307. The display devices 309*a-b* may have a microphone (not shown), a microphone array (not shown), or a speaker (not shown) and may be configured to record and fingerprint audio. The display devices 309*a-b* may be configured to compare the fingerprint to any fingerprint received from the remote control 307. If the display devices 309*a-b* determine a matching fingerprint, the display devices 309*a-b* may, like the controllable devices 305*a-b*, send a message to the remote control 307 indicating a match, or otherwise coordinate with other controllable devices to facilitate pairing with the remote control 307. Display devices 309*a-b* may be paired to a remote control along with the corresponding controllable device 305*a-b*.

The controllable devices (controllable devices 305*a-b* and/or display devices 309*a-b*) may be configured to query other controllable devices at the premises to determine whether other controllable devices have matched an audio fingerprint with the fingerprint from the remote control 307. The other controllable devices may respond to the query and indicate whether an audio match has been determined. When multiple audio matches are present, the controllable devices may be configured to ascertain additional details from the controllable devices with audio matches. For example, the controllable devices may be further configured to determine the closest controllable device to the remote control, whether any of the controllable devices are already paired to a remote control, whether any of the controllable devices are expecting to pair to this type of remote control, or whether to display a user interface to assist the determination of which controllable device is the intended device for pairing, such as is described below. The additional details may be used to filter the number of matching devices returned to the remote control, such as is described below.

Figure 4:
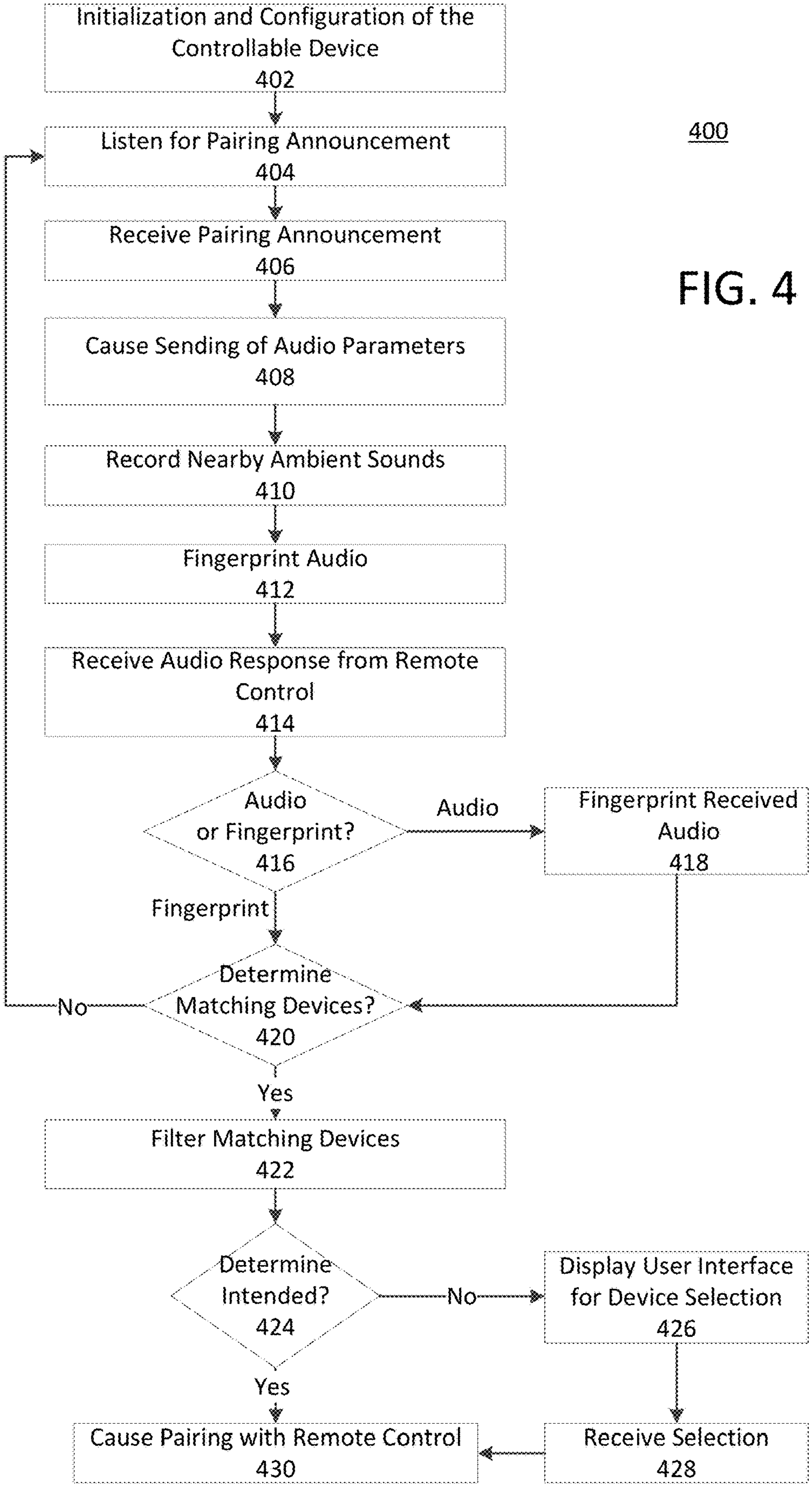
FIG. 4 is a flow chart showing an example method for pairing a remote control with a controllable device using audio fingerprints.

FIG. 4 shows an example method performed by a controllable device such as the controllable device 305*a* in the system of FIG. 3. The method of FIG. 4 could also, or alternatively, be performed by the controllable device 305*b*, the remote control 307, the display devices 309*a-b*, a wireless device, a mobile phone, or other computing device capable of pairing with another device. The method shown in FIG. 4 and/or one or more steps thereof may be performed based on execution, by one or more processors of one or more computing devices, such as computing device 200, of instructions that are stored in a computer-readable medium, such as a non-transitory computer-readable memory, such as is described for FIG. 2. The steps in these flow diagrams need not all be performed in the order described or shown, and some steps may be omitted and/or otherwise changed.

FIG. 4 is a flowchart showing an example method 400 performed by the controllable device 305 for pairing the remote control 307 with a controllable device. In the example of FIG. 4, the controllable device 305*a* may initially not be paired with a remote control. For example, a user may have received a new controllable device and may be turning it on for the first time. The controllable device 305*a* may also already be paired with a remote control and may be configured to allow multiple remote control pairings. In step 402, after start up, the controllable device 305*a* may perform an initialization and/or configuration sequence, during which the controllable device 305*a* may recognize that it is an unpaired device. The controllable device may have previously been operational in a wireless network, such as an RF4CE network, and may restore pairing tables from memory. The controllable device 305*a* may, in step 404, listen for wireless communications from a device, such as the remote control 307, that may indicate that the device is seeking to pair with a controllable device. In step 406, the controllable device 305*a* may receive a pairing discovery request from the remote control 307. The pairing discovery request may indicate information identifying the remote control 307 and pairing information, including desired or supported characteristics of a controllable device. For example, the pairing discovery request may comprise one or more of a source, a requested controllable device type, supported security, a list of supported device types, device capabilities, vendor identifier, serial number, a list of supported manufacturer profiles, class descriptors, filters, recording parameters, or the like.

In step 408, the controllable device 305*a* may send a wireless communication in response to the pairing discovery request, where the wireless communication includes audio recording parameters to assist in the pairing process. The controllable device 305*a* may also send the wireless communication after detecting audio, such as a voice command or other audio signal to initiate pairing without having received a discovery request. Because RF communications can go through walls and floors, it is possible that more than one controllable device received the pairing request from the remote control 307, so it may be desirable to determine which controllable device was intended to be controlled by the user. The user may be near the intended controllable device, so to determine the intended controllable device, both devices may record audio (e.g., ambient noise, voice commands, sounds, or other audio signals) and compare fingerprints of the recorded audio. If only one controllable device received the discovery request, the remote control 307 and controllable device 305*a* may be able to skip recording and fingerprinting audio and initiate a pairing sequence with each other.

Corresponding, or matching, fingerprints may indicate that the devices recorded the same sounds and are in the same room, or that there is a close proximity between the two devices. Mismatching fingerprints may indicate that the remote control may be communicating with another device in another room that may be within range of the RF communication, but is not the intended controllable device. For example, in the example of FIG. 3, a ceiling fan 311 is in a room with the controllable device 305*b* and display device 309*b* adjacent to the room with the remote control 307, which may have the radio 310 playing. The ceiling fan 311 and the radio 310 may cause the ambient noise near the controllable device 305*b* and the display device 309*b* to be different than the ambient noise near the controllable device 305*a* and the display device 309*a* in the adjacent room with the remote control 307. A fingerprint may be mismatching if it does not meet a minimum threshold to be considered a match. The threshold may be based on one more characteristics of the audio and/or audio fingerprint. If the sounds near the remote control 307 register at 40 dBa, and the sounds near the controllable device 305*b* register at 80 dBa, then regardless of other audio characteristics, the remote control 307 and controllable device 305*b* may be a mismatch and not initiate pairing. If no fingerprints are determined to be matching, then the process may be repeated until a matching fingerprint is determined or for a predetermined number of times. For example, after three unsuccessful attempts, the devices may cease the pairing process.

The message sent by the controllable device 305*a* may comprise parameters to assist the remote control 307 in recording and/or fingerprinting audio and synchronize the recording by the remote control 307 and the controllable device 305*a*. Having coordinated recordings may provide the system with comparable fingerprints which assist in determining whether the devices are near one another or in the same room. The parameters may include one or more of, for example, an instruction to record audio, a start time, an end time, a duration, an instruction to fingerprint the recorded audio or the like. The start time and/or end time may be an actual time, an amount of time that has lapsed from the time the message was sent (e.g., 100 ms, 500 ms, etc.), the amount of time that has lapsed from a time stamp in the message, or another trigger to start and/or end the recording such as an audible trigger. The duration may be an actual length of time to record the audio (e.g., 100 ms, 500 ms, etc.). If the controllable device 305*a* determines that the display device 309*a* is on and not muted, the parameters may direct recording of program audio or other known audio content. For successive attempts to find matching fingerprints, one or more of the recording parameters may be adjusted. For example, the recording duration may be increased to obtain a longer audio sample. The default recording parameters may be adjusted based on success and/or failure rates over time. Additionally, or alternatively, any of the remote control 307, the controllable device 305*a* or other controllable devices, may generate and playback an audio sequence to be recorded per the recording parameters. The audio sequence may be one or more sounds played at a specific frequency or in a specific pattern. The instruction to fingerprint the recorded audio may include the method of fingerprinting, where to send the fingerprint for analysis, or an instruction to send the recorded audio to another device for fingerprinting. For example, the instruction may direct the remote control 307 to send the recorded audio so that it may be fingerprinted by the controllable device 305*a*, the gateway 304, or the server 303. The remote control 307 may send the fingerprint and/or the recorded audio as it sent the initial pairing announcement, for example, via channels, such as channels accessed using IEEE 802.11 or 802.15 protocols.

More than one controllable device, such as controllable device 305*b*, display device 309*a* and/or display device 309*b*, may receive the pairing announcement from the remote control 307 in addition to the controllable device 305*a*. Prior to responding with the audio parameters, the controllable devices may determine which controllable devices received the remote control pairing announcement and designate one of the controllable devices to coordinate the pairing process by causing that designated controllable device to send the audio recording parameters, so instead of sending multiple sets of recording parameters for each responding controllable device, only one set of recording parameters may be sent to the remote control 307.

In step 410, the controllable device 305*a* may turn on its microphone 308 and record audio using some or all of the recording parameters sent in response to the pairing discovery request. Synchronizing the start time and duration, for example, may assist in the analysis and comparison of the fingerprints because if the devices recorded audio at different times or lengths of time, the fingerprints of the audio would not correspond to the same audio, resulting in different fingerprints. The controllable device 305*a*, in step 412, may fingerprint its own recorded audio or send the audio to another computing device for fingerprinting, such as the server 303. Fingerprinting the audio may comprise, for example, identifying signal strength and/or volume at one or more frequencies in the audio; recognizing patterns in the audio; and/or any other desired audio processing that will allow for comparison. Additionally, or alternatively, after a single controllable device sends recording parameters on behalf of multiple controllable devices, the controllable device 305*b* and the display devices 309*a-b* may also turn their microphones on and record audio in accordance with one or more of the audio recording parameters in the message from the single controllable device and then each may separately fingerprint their own recorded audio, or send the audio to another controllable device for fingerprinting.

In step 414, the controllable device 305*a* may receive a response that was sent by the remote control 307. The remote control 307 may have turned on its microphone 313 and recorded audio in accordance with one or more of the recording parameters in the message from the controllable device 305*a*. The remote control 307 may fingerprint the audio before sending it to the controllable device 305*a*. The remote control 307 may also stream the recorded audio back to the controllable device 305*a*. The controllable device 305*b* and the display devices 309*a-b* may also receive the response from the remote control 307. Instead of using such messages, the remote control 307 may also create a temporary pairing with the controllable device 305*a* to send the audio data. A temporary pairing may include, for example, a security enabled communication channel to allow the devices to exchange information to assist the pairing process prior to binding the pairing. The controllable device 305*a* may determine, in step 416, whether the response includes an audio fingerprint or recorded audio. If the response includes recorded audio, in step 418, the controllable device 305*a* may fingerprint the received recorded audio or may send the received recorded audio to another controllable device, such as the server 303, for fingerprinting.

Whether the response includes a fingerprint or the controllable device 305*a* creates or obtains a fingerprint of the received recorded audio, the controllable device 305*a*, in step 420, may determine whether the audio fingerprint received from the remote control 307 matches the fingerprint of the audio recorded by the controllable device 305*a* in step 410 and fingerprinted in step 412. If the controllable device 305*a* sent recording parameters on behalf of multiple controllable devices, the controllable device 305*a* may communicate with the other multiple controllable devices via the gateway 304 or other internal network at the premises 301 to determine whether any of the multiple controllable devices matched their respective audio fingerprints to the fingerprint from the remote control 307. Matching fingerprints may indicate that the two devices recorded the same ambient noise, or audio, and may be, therefore, in close proximity. Referring to the example of FIG. 3, the ceiling fan 311 may cause the ambient noise recorded by controllable device 305*b* to be different than the ambient noise recorded by the controllable device 305*a* and the remote control 307. Fingerprints may be matching if the fingerprints are the same or substantially the same. Fingerprints may also be matching if the fingerprints are the best matching fingerprints of all the responding devices. Fingerprints may be matching if there enough similarities to meet a minimum matching threshold. The threshold may be dynamic and may be adjusted based on success and/or failures tracked over time.

If the controllable device 305*a* does not determine a match with its own audio fingerprint or with any of the multiple controllable devices, then the controllable device 305*a* may resume listening for advertisements or discovery requests as in step 404. If a temporary pairing between the remote control 307 and the controllable device 305*a* was created, and if the fingerprints do not match, then the secure communication channel associated with the temporary pairing may be dropped.

After the filtering, the controllable device 305*a* may narrow the number of matching controllable devices, or even determine a single intended match. If the controllable device 305*a* is the only intended match, then in step 430, the controllable device 305*a* may cause pairing between itself and the remote control 307 by initiating a pairing sequence. If a temporary pairing was created between the controllable device 305*a* and the remote control 307, then the temporary pairing may be confirmed or made non-temporary. If another single controllable device is determined to be the intended matching device, in step 430, the controllable device 305*a* may cause a pairing sequence to be initiated by the intended matching device with the remote control 307.

If there are multiple matches and the controllable device 305*a* is unable to determine a single intended controllable device, then in step 426, the controllable device 305*a* may cause the display of a user interface for device selection in step 426. The controllable device 305*a* may cause a display on display device 309*a* requesting the user select the intended device from a list of possible devices. The user may highlight and select the device or may enter the number associated with the device list by pressing buttons on the remote control, or the like. The user may also select the device using audio commands. The controllable device 305*a* may cause a display requesting the user to say a phrase to determine which devices detected the phrase. The controllable device 305*a* may also cause the remote control to display a list of devices for selection by the user, such as is described further below regarding FIGS. 6A-6G. In step 428, the controllable device 305*a* may receive an indication of the selected device, and then the selected device may initiate a pairing sequence with the remote control 307 (step 430).

Additionally, or alternatively, the remote control 307 may record and stream television audio (or fingerprint of the audio) to the controllable device 305*a*, or to television that is playing the audio (e.g., display devices 309*a-b*). In this case, the television receiving the streamed audio (or fingerprint) may identity the streamed audio (or fingerprint) as the audio it is playing (or associated with the audio it is playing). The television may then initiate pairing with the remote control 307.

Figure 5:
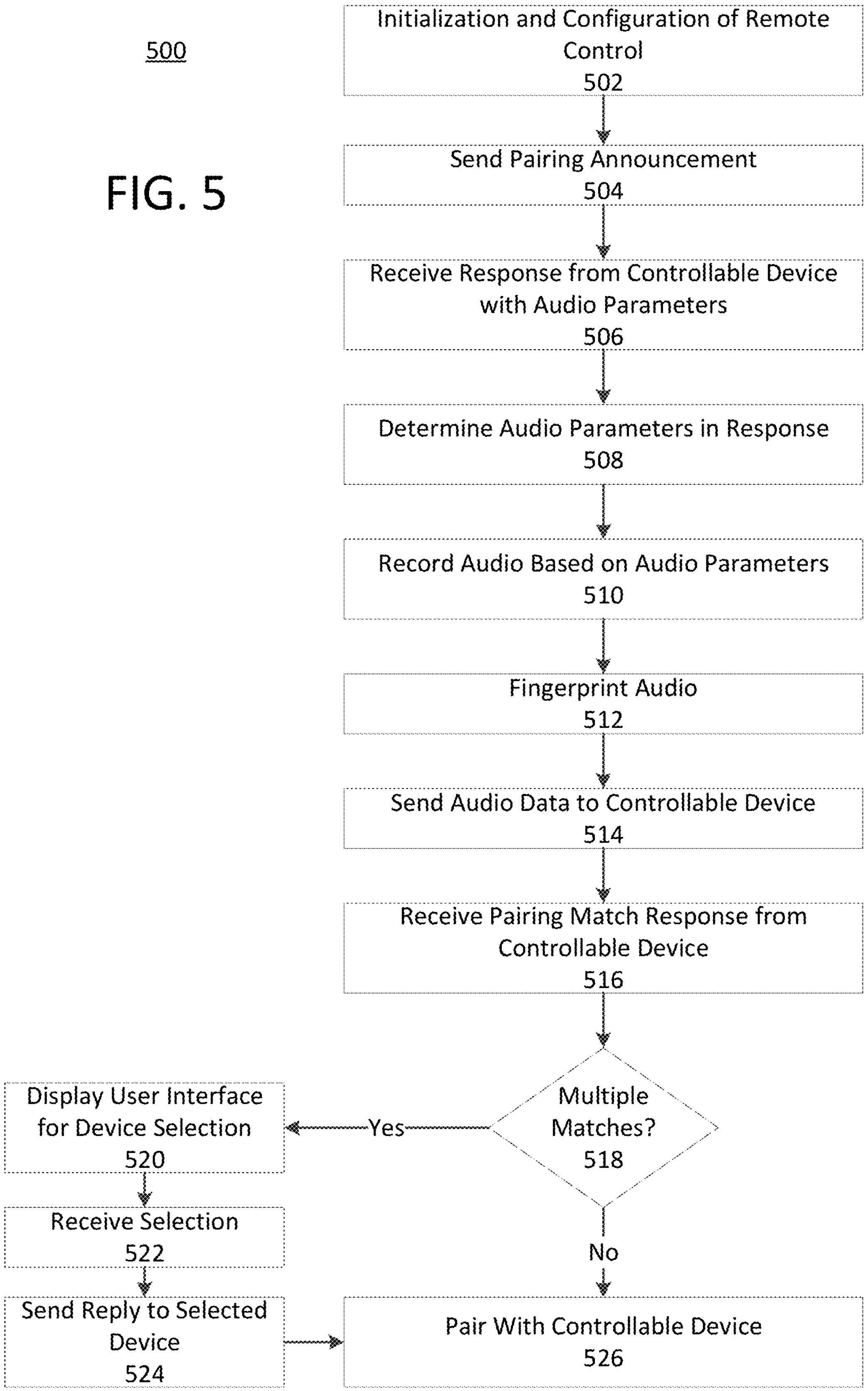
FIG. 5 is flow chart showing another example method for pairing a remote control with a controllable device using audio fingerprints.

FIG. 5 shows an example method performed by a remote control device such as the remote control 307 in the system of FIG. 3. The method shown in FIG. 5 and/or one or more steps thereof may be performed based on execution, by one or more processors of one or more computing devices, such as computing device 200, of instructions that are stored in a computer-readable medium, such as a non-transitory computer-readable memory, such as is described for FIG. 2. The steps in these flow diagrams need not all be performed in the order described or shown, and some steps may be omitted and/or otherwise changed.

Figure 6A:
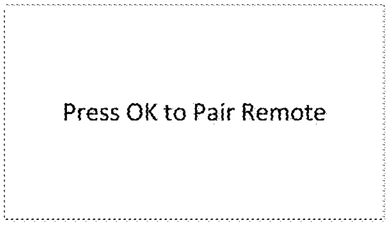
FIGS. 6A-6G are screen shots related to another example method for pairing a remote control with a controllable device.
Figure 6B:
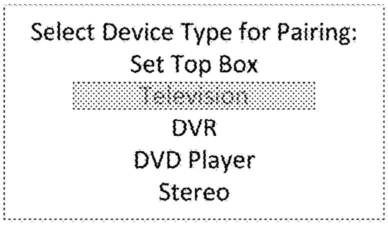

FIG. 5 is flow chart showing an example method 500 performed by the remote control 307 for pairing the remote control 307 with a controllable device. FIGS. 6A-6G are possible screen shots that may be displayed by the remote control 307 during the method 500. Additionally, or alternatively, the remote control 307 may be configured to audibly speak the options that are displayed in the screen shots shown in FIGS. 6A-6G. In the example of FIG. 5, the remote control 307 may initially be an unpaired remote control, or a paired remote control that is capable of pairing with more than one controllable device. In step 502, the remote control 307 may perform an initialization and/or configuration sequence, during which the remote control 307 may recognize that it is unpaired. The remote control 307 may display a message, such as shown in FIG. 6A, requesting confirmation to pair the remote control. Additionally, or alternatively, the remote control 307 may be triggered to pair with a controllable device after receiving a press of a button or key combination, receiving a voice command, detecting a sound or sound sequence, a user putting batteries in the remote control, charging the remote control, being proximate to a controllable device, or the like. As part of this start up sequence, the remote control 307 may also display, as shown in FIG. 6B, a message allowing a user to select and request a preferred device type for pairing. The user may highlight and select the device type, the user may be directed to press a certain key or key combination to select a device type, or the user may be instructed to speak the device selection. The remote control 307 may also be pre-programmed with a device type preference for pairing.

Figure 6C:

In step 504, the remote control may announce that it is available for pairing my sending a message via wireless communication channels, such as IEEE 802.11, IEEE 802.15, Zigbee, Bluetooth, and the like. The remote control may display a message indicating that it has started announcing that it is available for pairing, such as shown in FIG. 6C. The remote control 307 may also after detecting audio, such as a voice command or other audio signal, initiate a pairing sequence without sending a discovery request. In step 506, the remote control 307 may receive a response to its announcement from a controllable device within range of the remote control 307, such as the controllable devices 305*a-b* and/or the display devices 309*a-b* of FIG. 3. The remote control 307, in step 508, may determine parameters to record and fingerprint audio in the response.

Figure 6D:
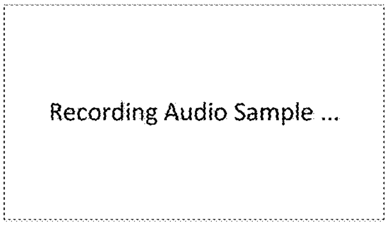
Figure 6E:

In step 510, the remote control 307 may record audio based on the audio parameters from the pairing response. The remote control may record an audio sample based on the pairing response received in step 506. The remote control 307 may display a message indicating that it is recording an audio sample, such as shown in FIG. 6D. The remote control 307 may fingerprint the audio sample(s) (step 512). In step 514, the remote control 307 may send the fingerprinted audio to the requesting controllable device and may display a message such as shown in FIG. 6E. The remote control may also send the fingerprinted audio to all of the controllable devices. Additionally, or alternately, the remote control 307 may send the audio recording(s) to the requesting controllable device or to another controllable device for fingerprinting.

Figure 6F:
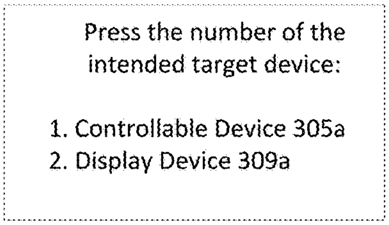
Figure 6G:

In step 516, the remote control 307 may receive a pairing match response from the requesting controllable device based on the remote control fingerprinted audio matching with the fingerprinted audio from one or more of the controllable devices. If, based on the matching, there is only a single controllable device match, then the remote control may pair with the matching controllable device (step 526). In the case of a single match, the pairing match response may comprise a pairing request to which the remote control could respond to bind the pairing. If, based on the pairing match response, there are multiple devices that matched the audio fingerprinted of the remote control 307 (step 518), then in step 520, the remote control may display a user interface prompting the user to select the intended controllable device for pairing with the remote control 307. In the case of multiple matches, the pairing match response may comprise information regarding each of the matching controllable devices. The user interface may display a list of the matching controllable devices and ask the user to select the correct device by pressing a button such as shown in FIG. 6F. The user may highlight and then select the correct device in the list using the remote control 307. The list may be a numbered list of devices and the user may enter the number of the desired device on the remote control 307. If the matching controllable devices include multiple display devices, the remote control 307 may cause the display devices to display a different identification number that may be selected by the user with the remote control, such as shown in FIG. 6G where display devices 600-602 each show an identification number to assist the user in selecting the correct device. The user may also issue a voice command to select the correct device.

In step 522, the remote control 307 may receive an indication of the user's selection of the controllable device for the remote control to pair with. Then, in step 524, the remote control 307 may send a reply to the controllable device that sent the pairing match response indicating the selected device. The remote control 307 may also send the reply to the selected controllable device. The remote control 307 may, in step 526, pair with the selected controllable device by responding to a pairing request from the selected controllable device to bind the pairing.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
- sending, by a first computing device and to a second computing device, a wireless message comprising timing parameters for recording audio by the second computing device, wherein the timing parameters comprise a start time;
- receiving, by the first computing device, from the second computing device, and based on the timing parameters, a response that comprises audio data;
- based on comparing, by the first computing device, the audio data from the second computing device with audio associated with the first computing device to determine a match, pairing the first computing device and the second computing device; and
- executing, after the pairing, a command received from the second computing device.

2. The method of claim 1, wherein the first computing device comprises a controllable device and the second computing device comprises a remote control.

3. The method of claim 1, wherein the pairing establishes a remote control relationship between the first computing device and the second computing device.

4. The method of claim 1, wherein the sending the wireless message is based on receiving, from the second computing device, a pairing announcement.

5. The method of claim 1, wherein the audio data comprises a first audio fingerprint, and wherein the audio associated with the first computing device comprises a second audio fingerprint associated with audio recorded by the first computing device.

6. The method of claim 1, wherein the audio data comprises audio recorded by the second computing device, and wherein the audio associated with the first computing device comprises audio recorded by the first computing device.

7. The method of claim 1, wherein the timing parameters for recording audio further comprise one or more of: an end time, or a duration.

8. A method comprising:

sending, by a computing device comprising a remote control, a wireless message comprising timing parameters for recording audio, wherein the timing parameters comprise a start time;

comparing, by the computing device, a plurality of controllable device audio recordings with a remote control audio recording to determine one or more audio matches, wherein the plurality of controllable device audio recordings is based on the timing parameters for recording audio;

causing, based on the one or more audio matches, display of a user interface indicating the one or more audio matches;

pairing the remote control associated with the remote control audio recording and a first controllable device associated with the one or more audio matches; and sending, based on the pairing, a command to the first controllable device.

9. The method of claim 8, further comprising, receiving the plurality of controllable device audio recordings.

10. The method of claim 8, wherein determining the one or more audio matches comprises determining a best audio match.

11. The method of claim 8, wherein the pairing is further based on receiving an indication of a user selection of the first controllable device.

12. The method of claim 8, wherein the pairing is further based on an indication of a user preference of a controllable device type.

13. A method comprising:

sending, by a computing device, a remote control pairing announcement;

receiving, by the computing device, based on the remote control pairing announcement, a response comprising timing parameters for recording audio, wherein the timing parameters comprise a start time;

sending, by the computing device and based on the response, a fingerprint of audio recorded based on the timing parameters;

receiving, by the computing device, a pairing message comprising an indication of one or more controllable devices that have audio data that matches the fingerprint of the recorded audio;

pairing, based on the pairing message, with a first controllable device of the one or more controllable devices; and sending, based on the pairing, a command to the first controllable device.

14. The method of claim 13, wherein the sending the remote control pairing announcement comprises sending, based on a triggering event, the remote control pairing announcement, and wherein the triggering event is based on one or more of: proximity to a controllable device, a voice command, a press of a button on a remote control, a press of a button on the controllable device, or installing batteries in a remote control.

15. The method of claim 13, wherein the remote control pairing announcement comprises one or more of:

a requested controllable device type, a list of supported device types, device capabilities, vendor identifier, serial number, a list of supported manufacturer profiles, class descriptors, or filters.

16. The method of claim 13, wherein the pairing, is further based on a requested controllable device type.

17. The method of claim 13, further comprising:

causing, based on the pairing message and via a user interface, output of a list of the one or more controllable devices; and receiving, via the user interface, a selection of a first controllable device of the one or more controllable devices.

18. One or more non-transitory computer-readable media storing instructions that, when executed, cause:

sending, by a first computing device and to a second computing device, a wireless message comprising timing parameters for recording audio by the second computing device, wherein the timing parameters comprise a start time;

receiving, by the first computing device, from the second computing device, and based on the timing parameters, a response that comprises audio data;

based on comparing, by the first computing device, the audio data from the second computing device with audio associated with the first computing device to determine a match, pairing the first computing device and the second computing device; and executing, after the pairing, a command received from the second computing device.

19. The one or more non-transitory computer-readable media of claim 18, wherein the first computing device comprises a controllable device and the second computing device comprises a remote control.

20. The one or more non-transitory computer-readable media of claim 18, wherein the pairing establishes a remote control relationship between the first computing device and the second computing device.

21. The one or more non-transitory computer-readable media of claim 18, wherein the instructions, when executed, cause the sending the wireless message based on receiving, from the second computing device, a pairing announcement.

22. The one or more non-transitory computer-readable media of claim 18, wherein the audio data comprises a first audio fingerprint, and wherein the audio associated with the first computing device comprises a second audio fingerprint associated with audio recorded by the first computing device.

23. The one or more non-transitory computer-readable media of claim 18, wherein the audio data comprises audio recorded by the second computing device, and wherein the audio associated with the first computing device comprises audio recorded by the first computing device.

24. The one or more non-transitory computer-readable media of claim 18, wherein the timing parameters for recording audio further comprise one or more of: an end time, or a duration.

25. A system comprising:

a first computing device; and a second computing device, wherein the first computing device is configured to:

send, to the second computing device, a wireless message comprising timing parameters for recording audio by the second computing device, wherein the timing parameters comprise a start time;

receive, from the second computing device and based on the timing parameters, a response that comprises audio data;

based on comparing, by the first computing device, the audio data from the second computing device with audio associated with the first computing device to determine a match, pair the first computing device and the second computing device; and execute, after the pairing, a command received from the second computing device, and wherein the second computing device is configured to:

send, based on the timing parameters, the response that comprises the audio data.

26. The system of claim 25, wherein the first computing device comprises a controllable device and the second computing device comprises a remote control.

27. The system of claim 25, wherein the pairing establishes a remote control relationship between the first computing device and the second computing device.

28. The system of claim 25, wherein the first computing device is further configured to send the wireless message based on receiving, from the second computing device, a pairing announcement.

29. The system of claim 25, wherein the audio data comprises a first audio fingerprint, and wherein the audio associated with the first computing device comprises a second audio fingerprint associated with audio recorded by the first computing device.

30. The system of claim 25, wherein the audio data comprises audio recorded by the second computing device, and wherein the audio associated with the first computing device comprises audio recorded by the first computing device.

31. The system of claim 25, wherein the timing parameters for recording audio further comprise one or more of: an end time, or a duration.

* * * * *